Sept. 5, 1967 R. T. MARTIN 3,339,475

POTATO STORAGE TREATING APPARATUS

Filed Oct. 7, 1966 2 Sheets-Sheet 1

*INVENTOR.*
ROBERT T. MARTIN
BY C. Harvey

HIS ATTORNEY

Sept. 5, 1967  R. T. MARTIN  3,339,475
POTATO STORAGE TREATING APPARATUS
Filed Oct. 7, 1966  2 Sheets-Sheet 2

INVENTOR.
ROBERT T. MARTIN
BY C. Harvey Gold
HIS ATTORNEY

United States Patent Office 3,339,475
Patented Sept. 5, 1967

3,339,475
POTATO STORAGE TREATING APPARATUS
Robert T. Martin, 1708 East 4800 South,
Salt Lake City, Utah 84117
Filed Oct. 7, 1966, Ser. No. 585,106
11 Claims. (Cl. 99—271)

This invention relates to an apparatus for controlling the environment in food storage structures, and in particular to an apparatus for controlling atmospheric environment surrounding potatoes which are stored in conventional storage enclosures.

It is established practice to store potatoes and other similar crops after they have been harvested in underground and above ground structures until they can be shipped to the various markets. In bulk storage of this type, the potatoes are merely piled in massive stacks within the storage cellar or structure and maintained within a predetermined temperature range. Heretofore, these storage areas have been entirely closed and completely insulated to enable the potatoes stored therein to be maintained within said predetermined temperature range, i.e., generally in the range of about 35 to 40 degrees Fahrenheit. If the potatoes are maintained at a temperature above the desired range they begin to decay and cannot be used for conventional purposes. Accordingly, during the hot summer months it has heretofore been necessary to use coolers in these storage areas. It has been found that when potatoes are thus stored they go through a natural process called pariderm which is often referred to as the sweat or rest period of the potatoes. During this period the potato's sugar content is substantially increased and their skin thickens. This phenomenon is caused by the lack of oxygen which surrounds said potatoes and is further aggravated by the low temperatures heretofore used in such storage. Potatoes which have passed through the rest period under conventional storage conditions generally cannot be used for chipping purposes, i.e., they cannot be used to make potato chips, because their increased sugar concentration causes them to take on a brown color when they are cooked. Accordingly, attempts have been made to overcome this problem by storing potatoes under elevated temperature conditions. However, as previously indicated, potatoes thus stored soon begin to decay and thus are not acceptable for chipping purposes. I have found that if potatoes are stored at an elevated temperature between about 45 to 55 degrees Fahrenheit in an environment containing .005 to 10 parts per million ozone during the aforementioned rest period, said potatoes may be stored at said elevated temperatures until they are ready to be shipped with no increase in potato decay rate being noted because of the elevated storage temperature conditions. In addition, potatoes thus stored can be used for chipping even though they have passed through the rest period. Accordingly, a great need has arisen for a device that will automatically control the environmental conditions in potato storage enclosures.

It is accordingly an object of my invention to provide an apparatus for controlling the environment in a vegetable storage structure which overcomes the defects and disadvantages heretofore found in such devices.

Another object of my invention is to provide a device for producing an ozone environment, maintained within a predetermined temperature and humidity range, which circulates said environment throughout a storage area.

Still another object of my invention is to provide a compact apparatus for controlling the environment in potato storage cellars.

Still another object of my invention is to provide a device for controlling the air flow within a storage structure which uses a single high pressure blower.

Still another object of my invention is to provide an apparatus for controlling the atmospheric environment in an enclosed vegetable storage structure which is adapted to draw cool air into said structure from the outside and maintain said air within said structure at a constant temperature.

Still other objects and attendant advantages of my invention will become apparent to those skilled in the art as the invention is better understood by reference to the detailed description appearing hereinafter.

The foregoing objects and attendant advantages are achieved by providing a high pressure blower, with an inlet side and an exhaust side, for circulating air in the interior of a storage enclosure. First duct means, with first shutter means for preventing air flow through said first duct means, are connected between said inlet side of said blower and an air source located outside of said storage enclosure and second duct means, with second shutter means for preventing air flow through said second duct means, are provided between said inlet side of said fan means, and the interior of said enclosure. Said first and second shutter means are provided with temperature sensitive activating means for closing said first shutter means and opening said second shutter means when the temperature inside said enclosure is below a predetermined temperature and for opening said first shutter means and closing said second shutter means when the temperature inside said enclosure is above a predetermined temperature and when the temperature outside said enclosure is below said predetermined temperature. In addition, ozone producing means are provided in communication with said inlet side of said blower which means are controlled by ozone concentration sensing means positioned in the interior of the storage enclosure. Said ozone concentration sensing means activate the ozone producing means when the ozone concentration inside the storage enclosure drops below a predetermined point. Ozone produced by the ozone producing means is drawn into the blower through its inlet side and forced outwardly therefrom through its exhaust side. The air exhausted from the blower is directed through heating means for heating said air to a predetermined temperature before it passes into the interior of the storage enclosure. Said heating means are controlled by temperature sensitive switching means for maintaining the temperature within the storage enclosure within a predetermined temperature range. In a preferred embodiment of my invention, water is injected into the air as it passes through said heating means for maintaining a predetermined humidity within the storage enclosure.

So that the invention can be more readily understood and carried into effect, reference is made to the accompanying drawings, which are offered by way of example only and are not to be taken as limiting the invention, the scope of which is defined by the appended claims, which obviously embrace equivalent structures and processes.

Figure 1:
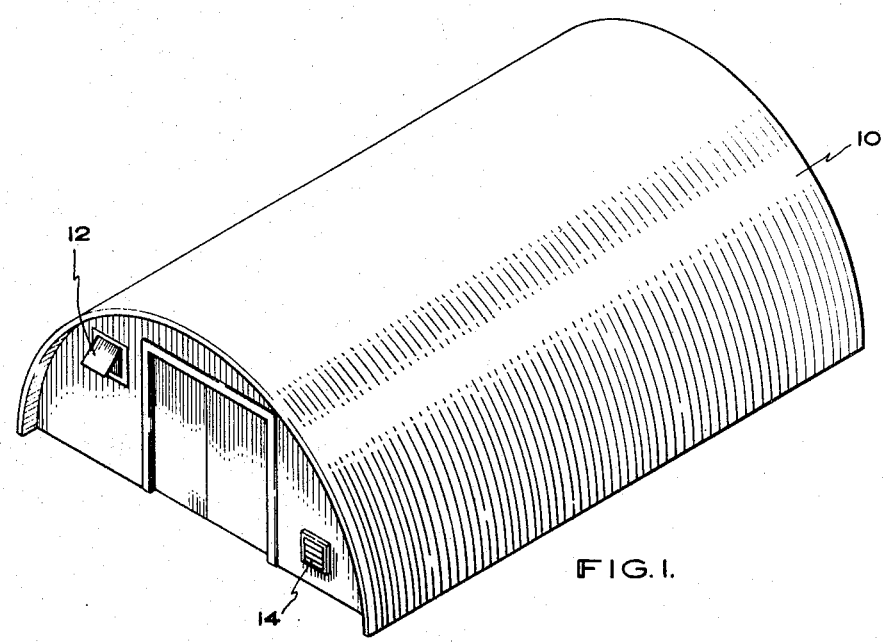
FIGURE 1 is a perspective view of a conventional vegetable storage enclosure showing air intake and exhaust ports in said enclosure.

Referring now more particularly to the drawings, FIGURE 1 shows a conventional storage structure used for storing vegetables such as potatoes in a bulk fashion after they have been harvested. Said storage enclosure 10 is completely confined to thus provide an enclosed interior area and, since vegetables stored within said interior area generally must be maintained within a predetermined temperature range, storage enclosure 10 is completely insulated to prevent rapid temperature changes therein when the temperature outside said enclosure is varied. Air exhaust port 12 and air intake 14, hereinafter described in detail, are provided in storage enclosure 10 for exhausting air from the interior of said enclosure and for drawing fresh air into said interior. It is to be noted that the aforementioned exhaust port 12 and air intake 14 may be positioned at any location within storage enclosure 10. However, it is preferred that air intake 14 be positioned on the northerly side of said enclosure 10 to thereby insure that the coolest air surrounding enclosure 10 is drawn into said enclosure. Also, it is preferred that exhaust port 12 be positioned away from intake 14 so that air exhausted through said port 12 is not drawn back into the interior of enclosure 10 through intake 14. Most preferably, exhaust port 12 is positioned in storage enclosure 10 at an opposite end from intake 14 to insure that air circulated within the interior of said enclosure by my apparatus does not bypass any of the vegetables stored therein. It is to be noted that while the apparatus of my invention can be used in the storage of various types of vegetables it is particularly adapted to be used in connection with the storage of potatoes, and most preferably, it is used for potatoes which are intended to be chipped. Accordingly, all reference to the use of my apparatus will be made in conjunction with the storage of potatoes.

Figure 2:
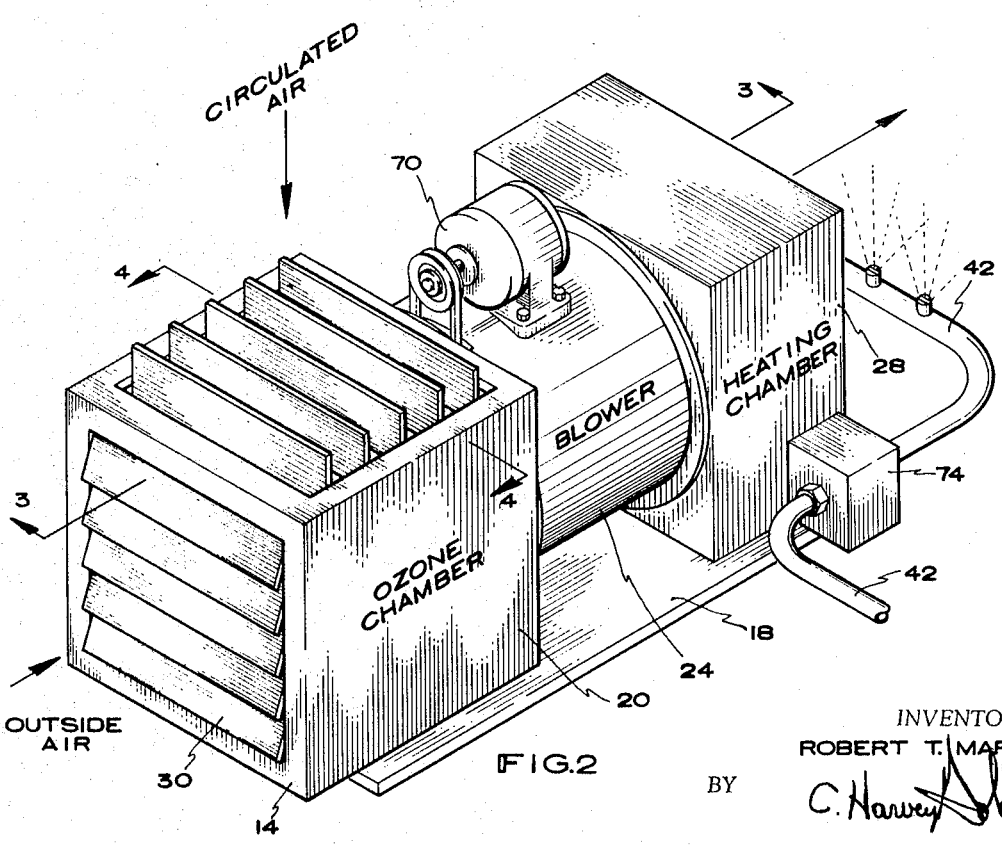
FIGURE 2 is a perspective view of the apparatus of my invention showing the ozone chamber and heating chamber and their relationship to the blower.

FIGURE 2 shows a perspective view of the apparatus of my invention. As shown, said apparatus is a compact one supported entirely on elongated support member 18. The apparatus generally comprises an ozone chamber 20 connected to intake side 22 of blower 24 and a heating chamber 28 connected to exhaust side 26 of said blower 24. Air is either drawn into said ozone chamber 20 from the outside of storage enclosure 10 through shutters 30, or, when circulation shutters 32 are open, air is drawn into said ozone chamber 20 from the interior of enclosure 10. It is to be noted that when circulation shutters 32 are open, shutters 30 are closed. Once air is inside ozone chamber 20 it is drawn through ozone generator 34, hereinafter described, wherein ozone is produced and passes into said air. The resulting ozone rich air stream is then drawn into intake side 22 of blower 24 and forced outwardly under pressure from blower 24 through its exhaust end 26 into heating chamber 28. From thence, said ozone enriched air passes through heater 36 and auxiliary heater 38 and outwardly from heating chamber 28 through exhaust port 40. Air passing through port 40 is blown over water tube 42 which is provided with a plurality of spray heads for spraying water into said air to alter its humidity in a fashion hereinafter described.

Figure 3:
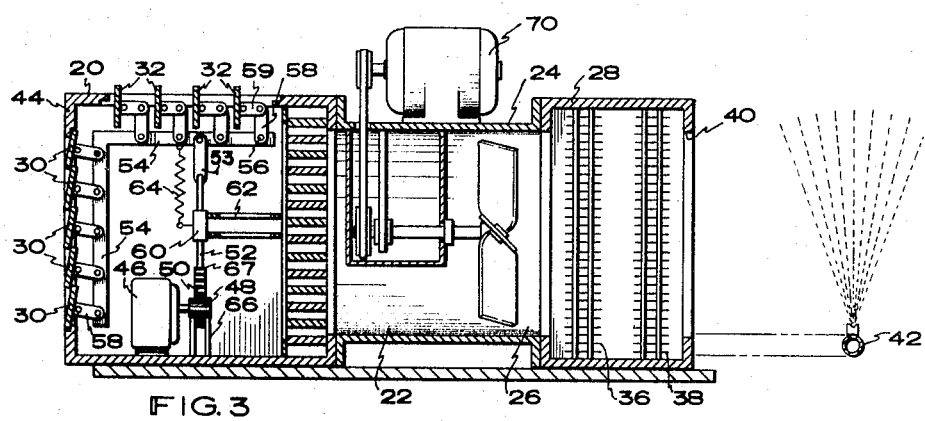
FIGURE 3 is a sectional view of FIGURE 2 taken long line 3—3, showing the shutter means for controlling the air flow through my apparatus and the preferred positioning of the ozone producing means, blower, heating means, and water injection means.
Figures 4, 5, 7:
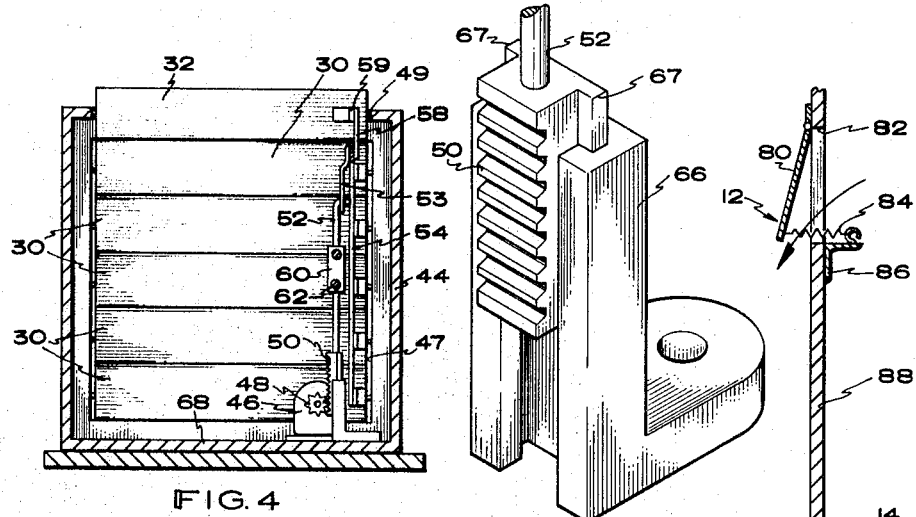
FIGURE 4 is a sectional view of FIGURE 2 taken along line 4—4 and showing in detail an end view of the air duct means with attached shutters.
FIGURE 5 is an enlarged perspective view of one preferred shutter activating means of the type shown in FIGURES 3 and 4.
FIGURE 7 is a partial sectional view of an end of a storage enclosure showing one type of pressure activated exhaust port provided in the structure and its relation to the apparatus of my invention which is positioned in the interior of said storage enclosure.

As shown in FIGURE 3, shutters 30 and 32 are interconnected so that when shutters 32 are closed, shutters 30 are opened, and conversely, when shutters 30 are closed, shutters 32 are open. Said shutters 30 and 32 are elongated members rotatably mounted at their opposite ends to ozone chamber housing 44 as shown in FIGURE 4. When the shutters are closed, they completely cover the opening in said housing 44 in which they are positioned, i.e., shutters 30 cover port 47 and shutters 32 cover port 49. As previously indicated, the position of said shutters 30 and 32 is determined by the temperature inside storage enclosure 10 and the temperature outside said enclosure. When the temperature in the interior of storage enclosure 10 is below a predetermined point, circulation shutters 32 are open and outside shutters 30 are closed, wherein air is circulated outwardly through port 40 in heating chamber 28 and from thence throughout the interior of said enclosure 10 and finally back to the interior of ozone chamber 20 past said circulation shutters 32. When the temperature in the interior of storage structure 10 raises above a predetermined temperature it becomes necessary to circulate air from another source into said storage structure. Shutters 30 are in communication with a source of air outside storage structure 10. In the event the air outside said storage structure 10 is at a temperature above the temperature of the air in the interior of the storage structure, circulation shutters 32 remain open and shutters 30 remain closed, notwithstanding the fact that the temperature in the interior of storage structure 10 is above said predetermined temperature. However, if the outside temperature is lower than the aforementioned inside temperature, said shutters 30 are opened. Shutters 30 and 32 are activated with motor 46 which is used to rotate gear 48. Said gear 48 coacts with rack 50 which is secured to one end of push rod 52 which rod in turn is connected at its opposite end to one end of pivoting member 53 and the other end of pivoting member 53 is connected to mounting bracket 54. Mounting bracket 54 is provided with a plurality of pins 56 to which shutter connecting members 58 are secured. Each of said shutter connecting members 58 are pivotally connected at one end to pins 56 and are connected at their other end to either a shutter or shutter activation linkage 59. Accordingly, when push rod 52 is moved upwardly (when sprocket 48 is rotated) circulation shutters 32 are opened while outside shutters 30 are closed. Push rod 52 is maintained in a substantially vertical position by tubular guide 60 through which said push rod 52 passes. Said tubular guide 60 is fixedly attached to ozone producing means 32, hereinafter described, with a plurality of brackets 62. When said motor 46 is deactivated, circulation shutters 32 are urged closed and outside shutters are opened with biasing means such as spring 64 which spring is secured under tension between sleeve 60 and connecting rod 54. Accordingly, said spring 64 urges connecting rod 54 downwardly through sleeve 60 when motor 46 is deactivated. Rack 50 is held in coacting relationship with sprocket 48 by bracket 66 shown in detail in FIGURE 5. Said bracket 66 is securely attached to bottom 68 of housing 44 with conventional attaching means such as a bolt, screw, etc. Keyway means are provided in bracket 66 which coact with outwardly extending ridges 67 provided on rack 50. Said outwardly extending ridges 67 retain rack 50 snugly within bracket 66 to thereby prevent it from moving outwardly away from sprocket 48.

Ozone producing means such as ozone generator 34 are positioned in the interior of ozone chamber 20 at a location between shutters 30 and 32 and intake side 22 of blower 24. Said ozone producing means may be formed in various ways; however, I prefer to use a conventional electrostatic device. Such devices generally comprise two or more discharging surfaces, placed in juxtaposition to form a condenser with an air gap which may or may not be furnished with a dielectric element. When a voltage is impressed between the plates, the air therebetween is ionized with consequent disassociation of the oxygen in said air, which oxygen combines to form ozone. Accordingly, air passing through either port 47 or 49 passes through ozone generator 34 before it passes into blower 24 wherein ozone ($O_3$) is produced From said ozone generator 34, the ozone enriched air flows into the intake side 22 of blower 24. It is to be noted that blower 24 may be any blower, compressor, fan, etc., that will handle large volumes of air at pressures from ¼ to 10 pounds per square inch (gauge) and, preferably, from ½ to 6 pounds per square inch. The volume of air which the blower is to circulate depends upon the size of the storage enclosure. I have found that a vane axial fan is generally the most preferred type of blower since it will circulate large volumes of air at a constant pressure of about 1½ pounds per square inch.

Air compressed by blower 24 passes through the blower's exhaust end 26 and into heating chamber 28. Heater 36 and auxiliary heater 38 are positioned in said heating chamber 28 so that air compressed by blower 24 will pass therethrough. Said heaters may be of any conventional design adapted to heat large volumes of air. For example, said heaters may comprise a plurality of high resistant wires through which a current is passed. The thus heated air exits from heating chamber 28 through port 40 provided in the end of said chamber. At this point, the air flows over water tube 42 which tube is provided with a plurality of nozzles for emitting a fine spray of water into the air stream. When this occurs, the water is absorbed in the air to thereby raise its humidity. From thence the ozone rich humid air flows inwardly into the interior of storage enclosure 10 where it is used to treat the stored vegetables contained therein.

Figure 6:
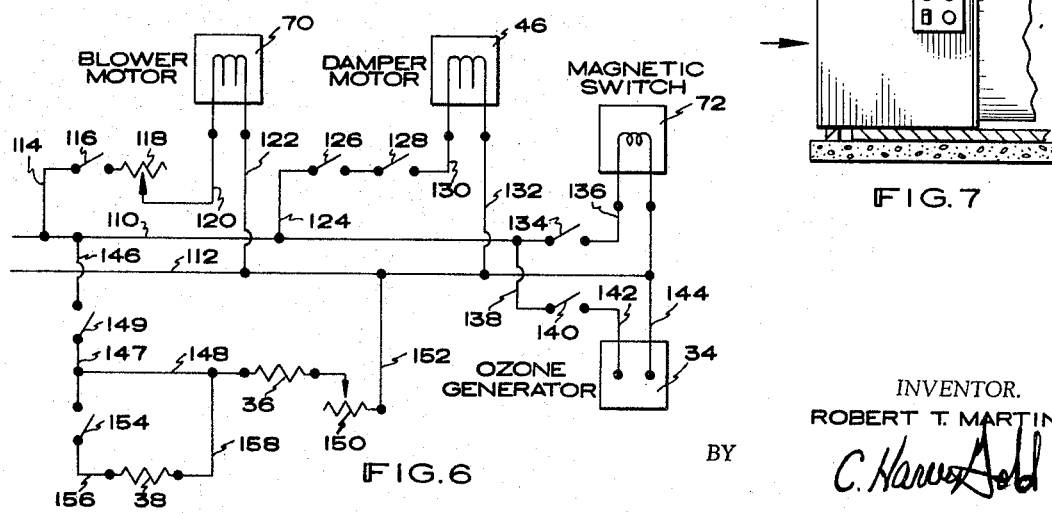
FIGURE 6 is a simplified wiring diagram showing a method to activate the blower motor, damper motor, ozone generator, heaters and humidity controlling means.

FIGURE 6 illustrates a fashion in which various components used in my apparatus may be wired for operation. Blower motor 70, which drives blower 26 in a conventional fashion, is activated by passing current from a conventional source, not shown in the drawing, along lines 110 and 114, through closed switch 116 to potentiometer 118. From thence, said current flows along line 120 to said motor 70. To complete the circuit, current flows from motor 70 along lines 122 and 112 back to said source. Damper motor 46 activated by passing current along lines 110 and 124, through closed switches 126 and 128, and from thence along line 130 to motor 46. To complete the damper motor circuit, current flows from said motor 46 along lines 132 and 112 back to said source. Switches 126 and 128 are conventional temperature activated switches. Switch 126 is activated by a sensing device which is positioned in the interior of storage structure 10, i.e., when the temperature in said interior raises above a predetermined temperature said switch closes. Switch 128 is activated by temperature sensing means such as a thermocouple which is positioned outside said storage structure 10. If the temperature outside said structure is below said predetermined temperature, switch 128 is closed. In this fashion, damper motor 46 is activated only when the temperature in the interior of storage enclosure 10 is above a predetermined temperature and the temperature outside said enclosure is below said predetermined temperature. Magnetic switch 72 is a conventional solenoid switch which is used to open or close valve 74 positioned in water line 42. Accordingly, when said solenoid is activated valve 74 is opened to thereby allow water to flow from a source, now shown in the drawings, through line 42 and through spray nozzles in said line 42 wherein water is sprayed into the air stream emitted from port 40 in my apparatus. Said magnetic switch 72 is activated when current passes along line 110, through switch 134, and from thence along line 136 to said solenoid 72. Current flows from solenoid 72 along line 112 back to its source. Switch 134 is a conventional humidistat which closes when the humidity in storage structure 10 drops below a predetermined point, hereinafter described. As previously indicated, ozone generator 34 is activated when current flows between plates or tubes spaced apart from each other. To accomplish this, current passes along lines 110 and 138, through closed switch 140, and from thence, along line 142 to a plate or tube of the type previously described. The current then passes or is arced to another plate, thereby forming ozone, and from thence, passes along lines 144 and 112 back to said source. Switch 140 may be activated by conventional ozone sensing means which causes said switch to be closed when the ozone concentration in the interior of storage structure 10 drops below a predetermined point. In a preferred embodiment of my invention said switch 140 is activated by a conventional timing device which closes said switch for a predetermined time at predetermined intervals. Finally, heater 36 is activated by passing current from line 110 along line 146, through closed switch 148, and along lines 147 and 148 to said heater 36. From thence said current flows through potentiometer 150, which is used to increase or decrease the current flowing through said heater, and finally back to its source along lines 152 and 112. Auxiliary heater 38 is activated when switch 154 is closed thereby allowing current to flow along lines 147 and 156 to said heater 38. From thence said current flows along line 158 to heater 36.

The apparatus of my invention is generally positioned in the interior of storage structure 10 as shown in FIGURE 7. It is also within the scope of my invention to position said apparatus outside said structure and use conventional duct means to connect circulating shutters 32 to the interior area of said storage structure 10. However, as indicated, in the preferred embodiment of my invention, my apparatus is placed in the interior of storage structure 10. When this is done, air intake means 14 are provided between the outside of storage structure 10 and fresh air shutters 30. Damper switch 128 is then connected to temperature sensitive means positioned outside said structure and damper switch 126 is connected with temperature sensitive means in the interior of said structure. Similarly, humidistat 134 and ozone sensing device 140 are also positioned in the interior of structure 10. Blower 70 is then activated by closing manual switch 116. The speed of said motor may be varied by adjusting potentiometer 118. Air is then drawn into the interior of ozone chamber 20 past either shutters 30 or 32 depending on the temperature of the air inside and outside storage structure 10. The air then passes through ozone producing means 34 wherein it is enriched with ozone until a predetermined ozone concentration is established in the interior of the storage structure, e.g., generally about .005 to 10 parts per million and preferably, about 0.01 to 5 parts per million. The ozone enriched air is then compressed by blower 24 and is passed through heater 36 and auxiliary heater 38. Heaters 36 and 38 are activated when temperature switch or thermostat 149 is closed. For example, in the storage of potatoes, said thermostat 149 is generally set to maintain the temperature in storage structure 10 at a point within a range between 35 and 70 degrees Fahrenheit. Auxiliary heater 38 may be activated by closing manual switch 154. This is generally only required when the temperature of the air passing into heating chamber 28 is substantially below the desired operating temperature. It is preferred to maintain the humidity in the storage structure at about the water level of the vegetables being stored. For example, in the storage of potatoes, the humidity is maintained between about 80 and 85 percent since the water level in the stored potatoes is generally within this range. If the humidity is not carefully maintained, the potatoes will shrink and thereby lose much of their value. Said humidity range is controlled by humidistat 134 as previously indicated.

When air is circulated into storage enclosure 10 from outside said enclosure, the pressure in the interior of the structure begins to increase. To prevent said pressure from exceeding a predetermined value, pressure release port 12 is provided in said structure as previously described. Said port 12 is pressure actuated so that when a predetermined pressure is placed on its inside surface it is forced open to allow air within enclosure 10 to escape therefrom. FIGURE 7 illustrates one type of pressure actuated port 12 that may be used in my invention. Said port comprises shutter 80 which is hinged at one end to the outside of wall 88 of storage enclosure 10 and is sized to cover port 82 in said enclosure. Biasing means such as spring 84 is secured at one end to shutter 80 and at its other end to mounting bracket 86, which bracket is in turn fixedly attached to the interior of said wall 88. Said spring 84 is under tension and thereby urges shutter 80 to move snugly against the outside surface of wall 88 to prevent air from flowing through port 82. However, when the pressure in the interior of enclosure 10 is increased, a force is exerted against shutter 80 which causes it to swing open. Accordingly, by varying the tension in spring 84 the pressure in enclosure 10 can be regulated.

Whereas there is here illustrated and specifically described a certain preferred construction which is presently regarded as the best mode of carrying out the invention, it should be understood that various changes may be made and other construction adopted without departing from the inventive subject matter particularly pointed out and claimed.

I claim:

1. In combination with an enclosed storage structure for storing vegetables, an air treating device comprising blower means with an inlet side and an exhaust side for circulating air under pressure in the interior of said structure; a first duct connected between said inlet side of said blower and an air source located outside said storage enclosure; first shutter means positioned in said first duct for controlling the flow of air through said first duct; a second duct connected between said inlet side of said blower means and the interior of said storage enclosure; second shutter means positioned in said second duct for controlling the flow of air through said second duct; activation means connected to said first shutter means and said second shutter means for opening said first shutter means while simultaneously closing said second shutter means and for closing said first shutter means while opening said second shutter means; ozone producing means provided in communication with said inlet side of said blower means for producing ozone which is drawn into said blower means; and exhaust duct means secured to the exhaust side of said blower for passing ozone enriched air from said blower into the interior of said storage enclosure.

2. The combination of claim 1 wherein heating means is positioned in said exhaust duct means for heating said ozone enriched air as said air passes through said exhaust duct means.

3. The combination of claim 2 wherein said heating means are controlled by temperature sensitive switching means positioned in the interior of said storage structure, wherein said heating means are energized when the temperature within said structure is below a predetermined temperature.

4. The combination of claim 1 wherein said ozone producing means is provided in communication with said exhaust duct means.

5. The combination of claim 1 wherein said activation means for opening and closing said first and said second shutter means includes first temperature sensitive switching means positioned outside said storage structure for activating a first switch when the temperature outside said structure is below a predetermined temperature; second temperature sensitive switching means for activating a second switch when the temperature inside said structure is above a predetermined temperature; and drive motor means controlled by said first switch and said second switch for opening and closing said first and second shutter means.

6. The combination of claim 5 wherein said first temperature sensitive switching means and said second temperature sensitive switching means are programmed to activate said drive motor means to open said first shutter means and close said second shutter means when the temperature outside said structure is below a predetermined temperature and when the temperature inside said enclosure is above a predetermined temperature and for closing said first shutter means and opening said second shutter means when the temperature inside said storage enclosure is below a predetermined temperature.

7. The combination of claim 6 wherein said storage structure is provided with pressure activated port means for exhausting air from within said structure when the air pressure within said structure exceeds a predetermined pressure.

8. The combination of claim 7 wherein said ozone producing means is provided with control means for controlling the ozone concentration within said storage enclosure.

9. The combination of claim 5 wherein spray means are provided proximate said exhaust duct means for spraying water into said ozone enriched air passed through said exhaust duct means.

10. The combination of claim 9 wherein said spray means are controlled by humidity sensitive switching means positioned in the interior of said storage structure, wherein said spray means is activated when the humidity within said structure is below a predetermined humidity.

11. The combination of claim 1 wherein said ozone producing means is provided with control means for controlling the ozone concentration within said storage enclosure.

References Cited

UNITED STATES PATENTS

| | | | |
|---|---|---|---|
| 1,938,889 | 12/1933 | Bloom | 99—271 |
| 1,975,541 | 10/1934 | Forrest | 99—271 |
| 2,000,637 | 5/1935 | Hatch | 99—271 |
| 2,251,617 | 8/1941 | Pirnie | 99—271 |
| 2,342,998 | 2/1944 | Bieret | 99—271 |

WALTER A. SCHEEL, *Primary Examiner.*

ROBERT W. JENKINS, *Assistant Examiner.*